United States Patent [19]

Hauptmann

[11] Patent Number: 4,511,379
[45] Date of Patent: Apr. 16, 1985

[54] APPARATUS FOR TREATING FLUE GAS AND METHANOL CONTAINING EFFLUENTS

[75] Inventor: Edward G. Hauptmann, North Vancouver, Canada

[73] Assignee: Wescam Services Inc., Vancouver, Canada

[21] Appl. No.: 396,423

[22] Filed: Jul. 8, 1982

[51] Int. Cl.³ ............................................. B01D 47/00
[52] U.S. Cl. ...................................... 55/238; 55/233; 55/242; 55/410; 55/418; 55/459 B
[58] Field of Search ................. 55/259, 257 R, 90, 92, 55/418, 233, 223, 235-238, 410, 242, 459 B; 261/79 A, 98

[56] References Cited

U.S. PATENT DOCUMENTS

| | | | |
|---|---|---|---|
| 928,673 | 7/1909 | Lebrasseur | 55/459 B |
| 1,719,447 | 7/1929 | Pfeffer | 55/459 B |
| 1,792,097 | 2/1931 | Jacobson . | |
| 1,812,099 | 6/1931 | Kohr . | |
| 1,815,933 | 7/1931 | Sperr . | |
| 2,792,075 | 5/1957 | McBride | 55/349 |
| 2,969,851 | 1/1961 | Freeman | 55/238 |
| 3,324,632 | 6/1967 | Berneike et al. | 55/236 |
| 3,446,573 | 5/1969 | Richter . | |
| 3,554,859 | 1/1971 | Murray . | |
| 3,701,824 | 10/1972 | Prabacs et al. . | |
| 3,752,875 | 8/1973 | O'Hern . | |
| 3,794,711 | 2/1974 | Bhatia et al. . | |
| 3,944,402 | 3/1976 | Cheremisinoff | 55/92 |
| 4,049,399 | 9/1977 | Teller . | |
| 4,251,236 | 2/1981 | Fattinger et al. | 55/238 |
| 4,375,976 | 3/1983 | Potter | 55/259 |

FOREIGN PATENT DOCUMENTS

| | | | |
|---|---|---|---|
| 316891 | 12/1919 | Fed. Rep. of Germany | 55/90 |
| 657034 | 2/1929 | France | 155/237 |
| 341058 | 1/1931 | United Kingdom | 55/238 |
| 345937 | 8/1972 | U.S.S.R. | 55/238 |

OTHER PUBLICATIONS

"Recovery Boilers–Emission Control with Product and Energy Recovery"; Pulp and Paper Canada, vol. 81, No. 12, Dec. 1980.
Air Stripping Kraft Foul Condensates to Remove Methanol, Pulp & Paper Canada, vol. 80, No. 9, Sep. 1979, Blackwell et al.
Particle Conditioning by Steam Condensation AIChE Symposium Series, vol. 71, No. 147, about 1976 or 1977, C. B. Prakash and F. E. Murray.

Primary Examiner—Bernard Nozick
Attorney, Agent, or Firm—Townsend and Townsend

[57] ABSTRACT

A gas scrubber is provided which is particularly useful for scrubbing flue gas and condensate effluent from a kraft pulp mill. The scrubber comprises a first chamber having inner and outer looped parallel side walls, and first and second end walls extending therebetween. A gas inlet is positioned so as to direct gas passing through it between the side walls. Fluid nozzles on the inner wall are directed to spray liquid toward the outer wall. A gas outlet is provided which has at least a portion angularly spaced from the gas inlet. The walls of the first chamber are preferably arranged to provide an incremental volume between them which decreases with angular distance from the gas inlet. The gas outlet is dimensioned so that the velocity of the gas flowing between the walls is substantially constant. Preferably, the side walls are concentric, substantially circular and each of constant diameter. In addition, the first end wall is substantially planar and the second end wall is helical in configuration. A plurality of interconnected adjacent, concentric, toroidal chambers are also usefully provided in a sequence extending radially inwardly from the first chamber.

18 Claims, 4 Drawing Figures

APPARATUS FOR TREATING FLUE GAS AND METHANOL CONTAINING EFFLUENTS

FIELD OF THE INVENTION

This invention relates to an apparatus which is particularly useful in scrubbing flue gas and condensate effluent from a kraft pulp mill.

DESCRIPTION OF THE PRIOR ART

Various industrial sources produce flue gas containing unacceptable particulate emissions. In particular, flue gas from a kraft pulp mill contains such unacceptable particulate emissions, along with undesirable hydrogen sulfide. A kraft pulp mill also typically produces condensates primarily from the multiple-effect evaporators, which condensates contain a high proportion of methanol. It is undesirable to discharge such methanol containing condensates directly to a stream or river, as the methanol has a high biological oxygen demand thereby resulting in pollution problems associated with such condensates.

Various devices for removing particulates from flue gas are well known. For example, one of the more common is the simple cyclone. A modified cyclone has been provided in the past, which comprises an inside axially disposed liquid feed tube with a plurality of nozzles positioned thereon to direct liquid spray toward the outer wall of the cyclone. Such a device is of limited usefulness, since for a given gas flow the volume of scrubbing attainable is limited, it being possible to increase such volume only by unduly lengthening the cyclone. In addition, the maximum benefit of water scrubbing is attained only at the narrower end of the cyclone where increased gas velocities result in greater centrifugal forces on the suspended particulates. Other well known particulate removers consist of liquid scrubbers typically utilizing countercurrent flow. U.S. Pat. No. 3,944,402 to Cheremisinoff discloses a particulate scrubber utilizing the space between two preferably eccentric cylindrical columns. The gas velocity in such a device will vary and because co-current scrubbing is utilized, the device does not take full advantage of centrifugal force and water scrubbing to create a synergistic scrubbing effect.

Although counter-current and co-current packed scrubbers are well known to remove hydrogen sulfide from flue gas, such devices are typically not readily integrated with the apparatus utilized for particulate removal, interconnecting tubes or vents typically being required. In addition, should it be desired to perform additional scrubbing of the flue gas for purposes such as recovering heat from it, again a separate scrubber would typically be utilized with further interconnecting pipes or vents. Such arrangements are undesirable not only from the point of view of compactness, but also since such interconnecting vents or pipes tend to restrict flow through the overall system thereby producing an undesirable back pressure and limiting the overall rate at which the flue gas can be processed.

It is desirable then to provide a particulate scrubber which provides a large effective scrubbing volume and which sprays the liquid in such a manner as to take maximum advantage of centrifugal force on suspended particles to assist their collection, and which is readily integrated with an apparatus housing one or more other scrubbing steps so that a compact configuration is obtained which will generate only relatively low back pressure.

SUMMARY OF THE INVENTION

A first embodiment of the gas scrubber of the present invention comprises a first chamber. The first chamber has inner and outer looped parallel side walls and first and second end walls extending therebetween. The first chamber also has a gas inlet positioned so as to direct gas passing through the inlet tangentially between the side walls. Fluid nozzles are disposed on the inner wall so as to spray liquid toward the outer wall. The chamber also has a gas outlet which has at least a portion angularly spaced from the gas inlet.

In a second embodiment of the invention, the first chamber of the gas scrubber is provided with inner and outer looped parallel side walls, and first and second end walls extending therebetween. A gas inlet is provided in the outer wall adjacent a position of maximum height of it, and substantially equal in height to the maximum height of the outer wall. The first chamber also has a gas inlet positioned so as to direct gas passing through it tangentially between the side walls. Fluid nozzles are disposed on the inner wall so as to spray liquid toward the outer wall. A gas outlet is provided in a side wall and extends substantially around it. The walls of the first chamber are arranged to provide an incremental volume between them, which decreases with angular distance from the gas inlet. In addition, the gas outlet is dimensioned so that the velocity of the gas flowing between the walls is substantially constant.

Preferably, the incremental volume between the walls of the first chamber decreases regularly with angular distance from the gas inlet.

Of the various possible shapes of the inner and outer walls of the first chamber, such walls are usefully made circular and are substantially concentric. In addition, the gas inlet is advantageously disposed in the outer wall adjacent a position of maximum height thereof, and is substantially equal in height to that maximum height.

In a third embodiment of the invention, a gas scrubber is provided which comprises a first chamber having inner and outer concentric, substantially circular side walls, each of constant diameter. A substantially planar first end wall extends between corresponding end edges of the side walls. A helical second end wall is provided which extends between corresponding end edges of the side walls and once therearound to adjacent the first end wall. The first chamber also has a gas inlet in the outer wall adjacent the position of maximum height of it. The gas inlet is positioned so as to direct gas passing through it tangentially between the side walls. Fluid nozzles and a gas outlet as previously described are also provided.

The first and second end walls of the first chamber are preferably the bottom and top end walls thereof, respectively.

Usefully, the gas outlet extends substantially around an end of the inner side wall, and the gas inlet of the first chamber is substantially equal in height to the maximum height of the outer wall of the first chamber.

The third embodiment of the gas scrubber may usefully additionally comprise a substantially cylindrical central chamber disposed radially inward of the first chamber, and adjacent thereto. The central chamber has a gas inlet extending substantially around an end of the side wall thereof, and which is aligned and communicating with the gas outlet of the first chamber. The central chamber also has a gas outlet. Preferably, the gas outlet described extends around a lower end of the inner side wall, and the gas outlet in the central chamber is in a top wall. Advantageously, the gas inlet has a width substantially equal to the distance between the side walls.

The third embodiment of the gas scrubber may also usefully additionally comprises a toroidal second chamber disposed radially inward of the first chamber and adjacent to it. The second chamber has a gas inlet extending substantially around an end of the outer wall and aligned and communicating with the gas outlet of the first chamber. The second chamber also has a gas outlet extending substantially around the other end of the inner wall.

The gas scrubber may also be additionally provided with a plurality of adjacent concentric toroidal chambers disposed in a radially inwardly extending sequence, the outermost of the chambers being disposed radially inward of the first chamber and adjacent to it. Each of such toroidal chambers has a gas inlet extending substantially around an end of the outer side wall, and has a gas outlet extending substantially around the other end of the inner wall. The gas inlet of the outermost toroidal chamber is aligned and communicates with the gas outlet of the first chamber. The gas outlet of each toroidal chamber is aligned and communicates with the gas inlet of the adjacent inner toroidal chamber. Preferably, each of the toroidal chambers has a substantially rectangular vertical cross section.

A substantially cylindrical central chamber is also usefully additionally provided. Such central chamber is disposed adjacent the innermost of the toroidal chambers. The central chamber has a gas inlet extending substantially around an end of the side wall of it, and aligned and communicating with the gas outlet of the innermost of the toroidal chambers. The central chamber also has a gas outlet.

Preferably, the gas outlet of the first chamber extends around a lower end of the inner side wall of it, and only two toroidal chambers are present, and the gas outlet in the central chamber is in a top wall of it.

The gas inlet of the first chamber usefully has a width substantially equal to the distance between the side walls. Liquid spray nozzles are also usefully additionally provided, which are positioned in each of the toroidal chambers and the central chamber to spray downward in their respective chambers. Preferably, a packing is provided in the outermost of the toroidal chambers and in the central chamber.

All of the chambers are usefully disposed in a cylindrical housing, the bottom wall of the housing acting as the bottom wall of each of the chambers, the top wall of the housing acting as the top wall of each of the toroidal chambers, and the side wall of the housing acting as the outer side wall of the first chamber. The housing is provided with a plurality of concentric cylindrical baffles each of which defines an inner wall of one of the chambers and an outer wall of the inner chamber adjacent thereto.

DRAWINGS

An embodiment of the invention will now be described in detail with reference to the drawings in which.

DESCRIPTION OF THE PREFERRED EMBODIMENTS

Figure 1:
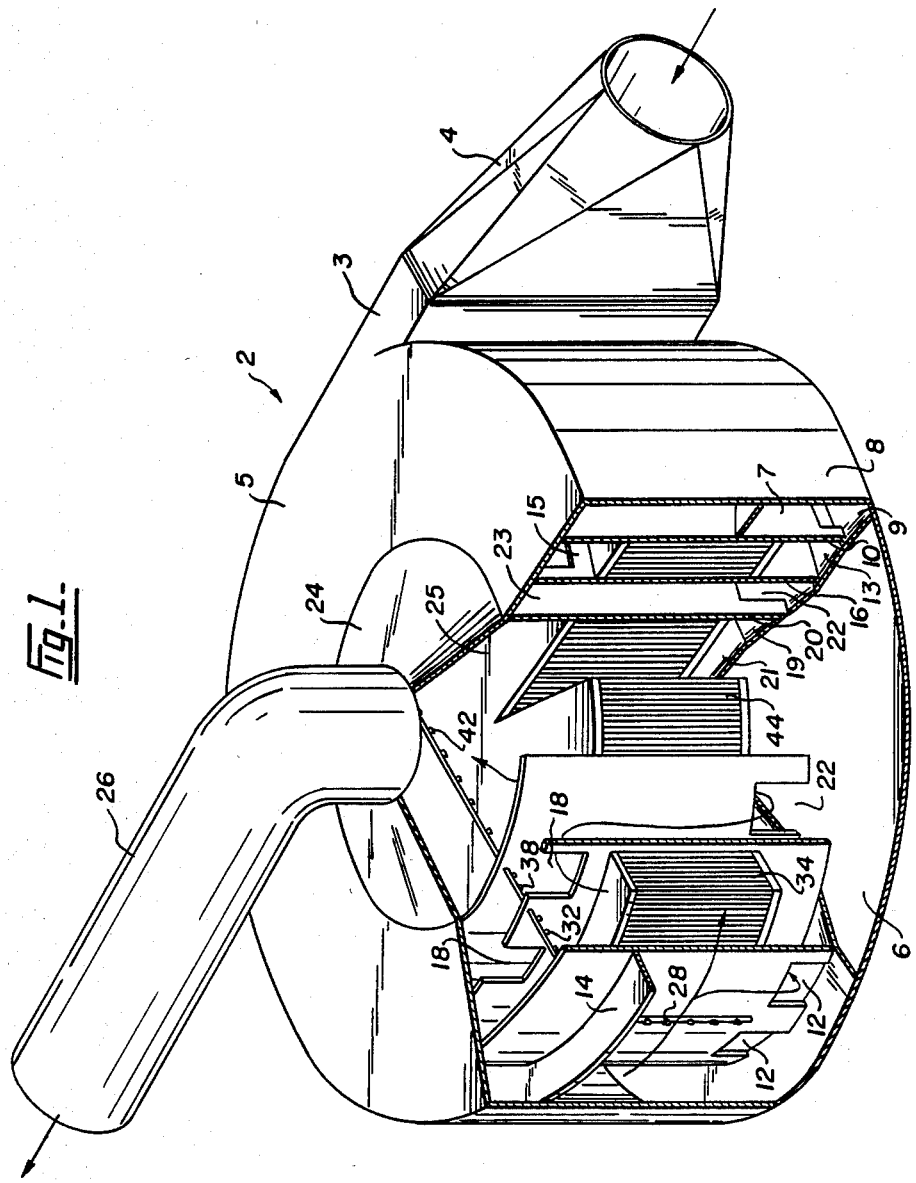
FIG. 1 is a perspective view of a gas scrubber of the present invention.

Referring first to FIG. 1, a substantially cylindrical housing 2 is provided. The housing 2 has a top wall 5, bottom wall 6, and outer wall 8. The housing is also provided with a plurality of concentric, substantially cylindrical baffles 10, 16 and 20, which together with the top wall 5 and bottom wall 6 serve to define second and third, toroidal, chambers 15 and 23 respectively, each of substantially rectangular vertical cross section. The baffle 20 together with the top wall 5 and bottom wall 6 serve to define a substantially cylindrical central chamber 25. A gas inlet 3 is provided in the outer wall 8, the gas inlet having a flared adapter 4 attached thereto. The gas inlet 3 is substantially equal in height to the outer wall 8 of the cylindrical housing 2. A helical baffle 14 is provided which extends between the outer wall 8 and baffle 10, and once around the outer wall 8 and baffle 10 from the top wall 5 of the housing 2 at a position adjacent the gas inlet 3, to the bottom wall 6. The helical baffle 14 acts as a top wall for a first chamber 7, while the bottom wall 6 acts as the bottom wall for that first chamber 7. The portions of the outer wall 8 and the first baffle 10 extending between the bottom surface 6 and the top wall 14, serve as the outer and inner side walls respectively of the first chamber 7. The gas inlet 3 is substantially equal in width to the first chamber 7 and is positioned so as to direct gas passing through the gas inlet 3 substantially tangentially between the side walls of the first chamber 7. The baffle 10 is provided with a series of openings 12 of decreasing height, which are positioned around the lower end of the baffle 10. The series of openings 12 can be regarded collectively as a gas outlet for the first chamber 7.

The first baffle 10 and second baffle 16 define outer and inner side walls respectively of the second chamber 15, while the second baffle 16 and third baffle 20 define outer and inner side walls respectively of the third chamber 23. The third baffle 20 also defines an outer side wall of central chamber 25. The gas outlet 12 (again regarded as the series of openings 12), also acts as the gas inlet 12 for the second chamber 15. Similarly, the series of substantially equal sized holes 18 which are disposed around an upper end of the second baffle 16, may be collectively regarded as a gas outlet for the second chamber 15, and a gas inlet for the third chamber 23. In a like manner, the series of holes 22 disposed around a lower end of the third baffle 20, may be collectively regarded as a gas outlet opening 22 for the third chamber 23, and a gas inlet opening 22 of the central chamber 25. To facilitate liquid collection in each of the chambers as will be hereinafter described, the bottom wall 6 is provided with sloping portions 9, 13, 19 and 23 as are most clearly shown in FIG. 2.

The top wall 5 of the housing 2 is provided with a conically-shaped central portion 24, which acts as the top wall of the central chamber 25. The conically-shaped portion 24 is provided with a centrally disposed circular opening, contiguous with which is provided exhaust gas outlet 26. A plurality of liquid spray nozzles 28 are provided on the baffle 10, so as to spray liquid in a direction toward the outer wall of the first chamber 7. Liquid spray nozzles 32, 38 and 42 are provided to spray liquid downward in chambers 15, 23 and 25 respectively. Liquid drains 30, 36, 40 and 46 are provided for respective chambers, each being located at the lowest point in the corresponding sloping surface portion 9, 13, 19 and 23 respectively. Each of the chambers 15 and 25 are provided with suitable packings 34 and 44 respectively.

Figure 2:
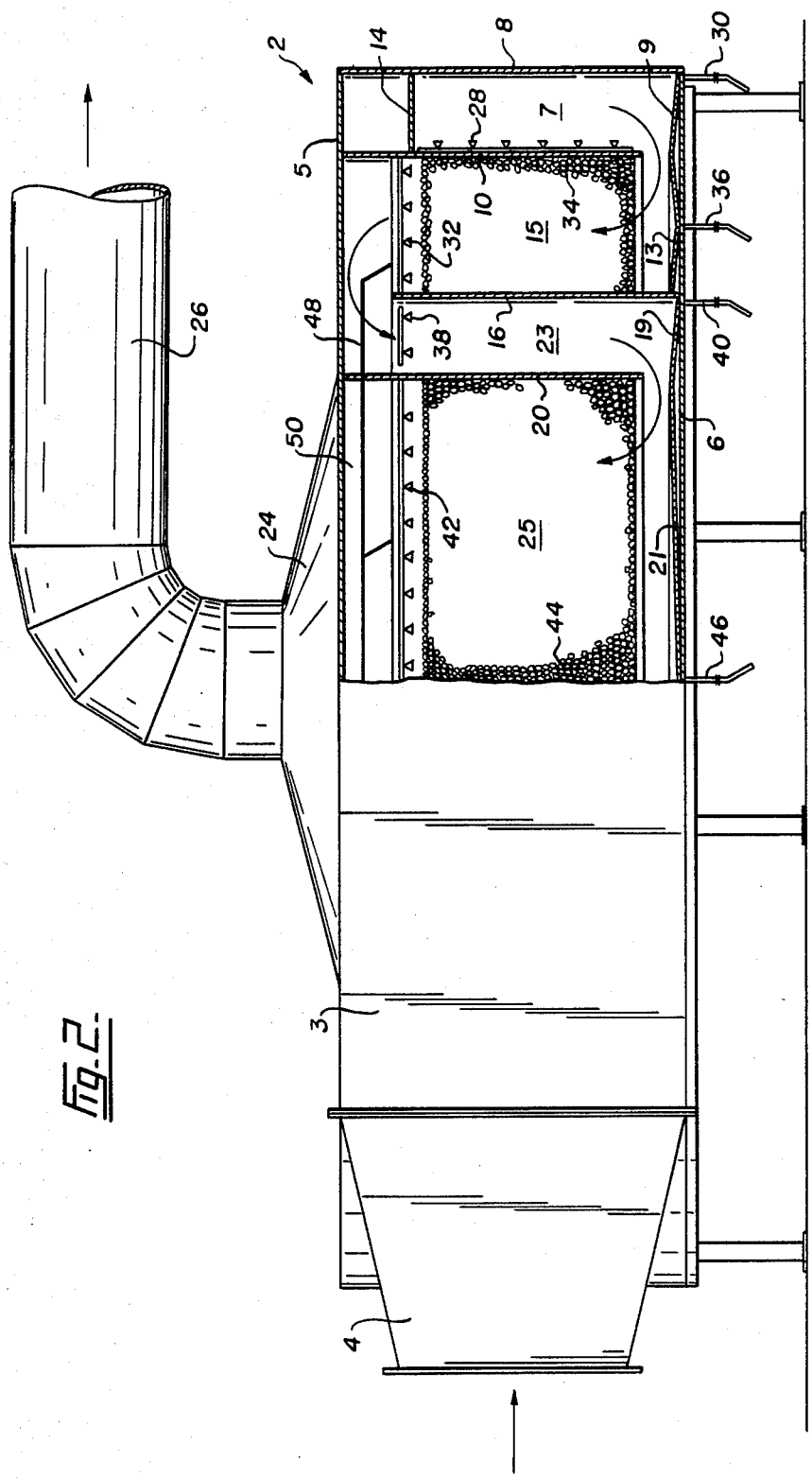
FIG. 2 is a vertical cross section of the gas scrubber shown in FIG. 1.
Figure 3:
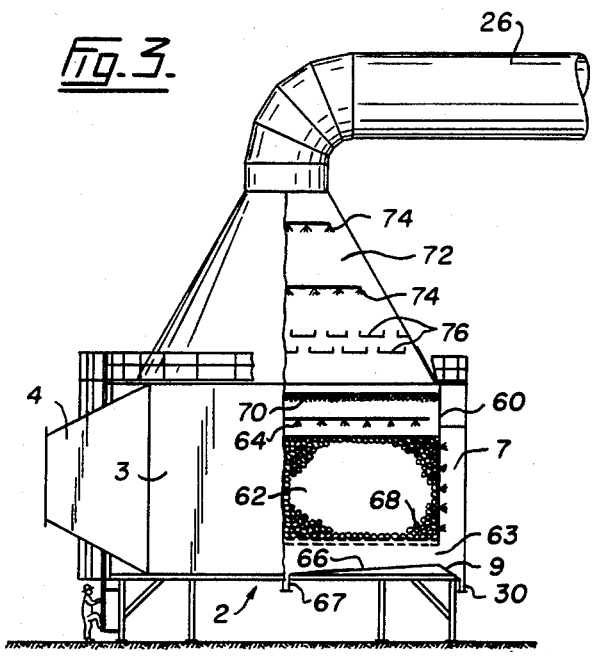
FIG. 3 is a side elevation, partly in section, of a modified form of the gas scrubber of FIGS. 1 and 2.
Figure 4:
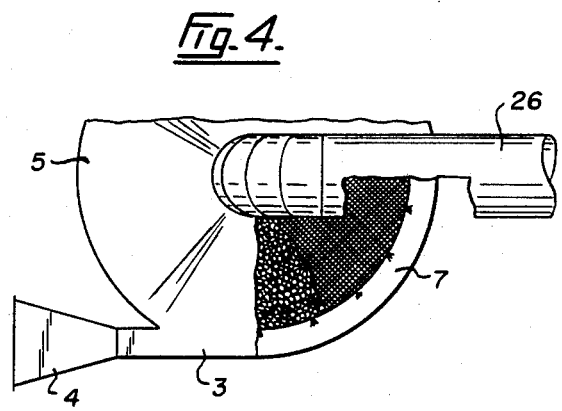
FIG. 4 is a top plan view, partly in section, of the gas scrubber of FIG. 4.

The gas scrubber shown in FIGS. 3 and 4 is similar in construction to that of FIGS. 1 and 2, and similar elements have been designated with the same reference numerals as used in FIGS. 1 and 2. In particular, this embodiment has a first chamber 7 of the same construction as previously described in connection with the embodiment of FIGS. 1 and 2. However, the housing 2 in this embodiment has only one substantially cylindrical baffle 60 disposed to form with the remainder of the housing a substantially cylindrical central chamber 62. The baffle 60 is provided with a series of openings 63 of decreasing size in the same manner as the openings 12 in the baffle 10 of the embodiment of FIGS. 1 and 2. These openings 63 serve as a gas outlet for the first chamber 7 and as a gas inlet for the central chamber 62. A plurality of liquid spray nozzles 64 are provided in the central chamber 62 for spraying a liquid downward in that chamber 62 and over a packing 68. A demister 70 is disposed above the liquid spray nozzles 64. The central chamber 62 also has a sloping portion 66 which slopes downward and inward toward a drain 67. A third frusto-conical chamber 72 has a lower end communicating with an upper end of the central chamber 62, and an upper end communicating with the exhaust gas outlet 26. Linear troughs 76 are arranged to collect liquid sprayed down from liquid spray nozzles 74.

The gas scrubbers described above are typically constructed of corrosion resistant metal or fibreglass and will have a height of about 20 feet. With regard to the gas scrubber of FIGS. 1 and 2, the outer diameters of the first chamber 7, second chamber 15, third chamber 23 and central chamber 25, will typically be 70 feet, 60 feet, 44 feet and 35 feet respectively. As well, the packings in chambers 15 and 25 would be about 12 feet in height and consist of any suitable material. The gas scrubber of FIGS. 1 and 2 can be used for kraft pulp mill flue gas and condensate purification, as follows. After the flue gas has been cooled to near its dew point, it is directed through adapter 4 and gas inlet 3 tangentially between the side walls 8 and 10 of the first chamber 7. In chamber 7, the gas is met by a water spray from nozzles 28, which work in conjunction with the centrifugal force experienced by suspended particles in chamber 7, to cause such particles to coalesce primarily adjacent outer side wall 8 of chamber 7. Some of the gas will escape through gas outlet 12 as it circulates through chamber 7, but the velocity (and hence centrifugal force on suspended particles) is maintained substantially constant throughout chamber 7 by virtue of helical top wall 14 and the decreasing size of the openings 12 proceeding from the gas inlet 3 and around the chamber 7. The effluent gas from the first chamber 7 would pass upwardly within the second chamber 15 to be met by a counter-current spray from nozzles 32 of an alkaline solution in order to scrub the flue gas of hydrogen sulfide and also sulfur dioxide. The flue gases then pass through the openings 18 in the baffle 16 and into the third chamber 23 where they are concurrently scrubbed with a water spray from nozzles 38 to recover heat from the flue gas. Following this, the flue gas will pass through openings 22 in the third baffle 20, and into the central chamber 25 where they will countercurrently scrub condensates from the kraft mill to strip methanol from them, and will then pass out exhaust gas outlet 26. The raised portion 24 of the top wall 5 of housing 2, assists in exhaust gas collection. Such exhaust gas passing through outlet 26 would typically be discharged to the atmosphere. Liquid drains 30, 36, co-operate with the sloping portions 9 and 13, respectively, of the bottom side 6 to collect the liquid effluent generated in each chamber and direct it for treatment. Drain 40 co-operates with the sloping portion 19 to collect heated water for return to the mill. Drain 46 co-operates with sloping portion 23 to collect scrubbed condensates for discharge to a sewer line. A demister 48 which is essentially a fine wire mesh, is arranged to collect any mist generated in chamber 15 and return it to that chamber so as to substantially prevent any solution from chamber 15 from entering chamber 3. Such a demister is not required between the third chamber 23 and fourth chamber 25 since only a small amount of warm water will escape from chamber 23 into chamber 25, such warm water likely ending up passing through line 46 and into the sewer line. A demister 50 is also provided, which is again, essentially a fine wire mesh, to coalesce fine liquid particles in effluent gas from central chamber 25 before it has passed through waste gas outlet 26.

With the dimensions as desribed above, the gas scrubber of FIGS. 1 and 2 can treat flue gas at a rate of about 250,000 SCFM, typically containing about 300 p.p.m. of hydrogen sulfide, and pre-cooled to a temperature of about 150° to 170° F. In such a circumstance, the flow rate of aqueous alkaline solution through nozzles 32 in chamber 15 would be about 24,000 USGPM, and the flow rate of condensates through nozzles 42 in chamber 25 from the same kraft pulp mill would typically be in the vicinity of 800 USGPM with about 2,000 p.p.m. of methanol. Most particulates down to about 0.5 microns would be removed in chamber 7 while the gas eventually discharged through exhaust gas outlet 26 would be at a temperature of about 140° F. and contain only about 4 p.p.m. hydrogen sulfide. The cleaned condensate flowing out line 46 would then contain only about 200 p.p.m. of methanol, and be at a temperature of about 140° F.

The gas scrubber of FIGS. 3 and 4 operates in a similar manner to that of FIGS. 1 and 2, with the exception that the central chamber 62 would typically be used to scrub the flue gas of hydrogen sulfide and sulphur dioxide, while the third chamber 72 is used for heat recovery from the flue gas leaving chamber 62. This particular construction is useful in a situation where condensate scrubbing is not required, and minimal horizontal space requirements must be met. Of course, if heat recovery is not required, the third chamber 72 can be completely eliminated. In a typical application, this gas scrubber would have a diameter of about 29 feet and a total height of about 22 feet. With such dimensions, the scrubber could handle approximately 120,000 SCFM and might be suitable for a 500 ton per day kraft pulp mill.

Various modifications to the embodiment of the gas scrubber described above are of course possible. Typically, the scrubber would be appropriately dimensioned for the volume of flue gas and condensate to be expected from the kraft pulp mill for which it is intended. Such appropriate dimensions are important particularly with regard to the first chamber 7, to ensure that there is a high centrifugal force exerted on suspended particles so as to assist their collection in the first chamber 7. Of course, the gas scrubber as described could be modified to be used in other gas scrubbing processes. For example, if it was desired to have concurrent scrubbing in chamber 15, the top surface of chamber 7 could be made substantially planar, while the bottom surface was constructed in a helical fashion similar to the top surface 7 as described above. The openings in the first baffle 10 would then be situated around a top end of that baffle. Other possible modifications include utilizing a first chamber 7 with width which decreases with angular distance from the gas inlet 3, and with substantially constant height. Such an arrangement would assist in maintaining a substantially constant velocity of gas within the chamber 7. However, such an arrangement would not be as desirable as that described above, since it would be difficult to arrange the gas outlet for the first chamber 7 in such a manner that undesirable turbulence will not be created (such turbulence being minimized by the configuration described previously). In addition, the second chamber 15 and third chamber 23 need not be rectangular in vertical cross section, but could potentially be of a great number of toroidal configurations. However, when those chambers have a rectangular vertical cross section, a more compact and readily constructed gas scrubber is obtained. In addition, such rectangular toroidal chambers would create relatively little turbulence (and hence generate relatively low back pressure).

The first chamber 7 could be provided with inner and outer side walls which are not circular but instead are simply looped. By "looped" is meant that they are of a closed curved configuration, such as elliptical. However, such a shape is not as desirable as circular walls which create a constant centrifugal force in suspended particles in the flue gas.

As will be apparent for those skilled in the art in the light of the foregoing disclosure, many further alterations and modifications are possible in the practice of this invention without departing from the spirit or scope thereof. Accordingly, the scope of the invention is to be construed in accordance with the substance defined by the following claims.

I claim:
1. A gas scrubber comprising a first chamber having:
 (i) inner and outer concentric substantially circular side walls each of constant diameter;
 (ii) a first end wall extending between corresponding end edges of the side walls;
 (iii) a helical second end wall extending between corresponding end edges of the side walls and once therearound to adjacent the first end wall;
 (iv) a gas inlet in the outer wall adjacent the position of maximum height thereof, the gas inlet being positioned so as to direct gas passing therethrough tangentially between the side walls;
 (v) fluid nozzles disposed on the inner wall so as to spray liquid toward the outer wall;
 (vi) gas outlets extending substantially around a side wall and dimensioned so that the velocity of the gas flowing between the walls is substantially constant; and
 (vii) liquid outlet means to allow liquid to leave the gas scrubber.

2. A gas scruber as described in claim 1 wherein the gas outlet extends substantially around an end of the inner side wall, and wherein the gas inlet of said first chamber is substantially equal in height to the maximum height off the outer wall thereof.

3. A gas scrubber as described in claim 1 wherein the first end wall of said first chamber is a planer bottom end wall, and the second end wall is a top end wall.

4. A gas scrubber as described in claim 3 wherein the gas outlets extend substantially around an end of the inner side wall, ad wherein the gas inlet of said first chamber is substantially equal in height to the maximum height of the outer wall thereof.

5. A gas scrubber as described in claim 4 additionally comprising a substantially cylindrical central chamber disposed radially inward of said first chamber and adjacent thereto, said central chamber having gas inlets extending substantially around an end of the side wall thereof and aligned and communicating with the gas outlets of said first chamber, and having a gas outlet.

6. A gas scrubber as described in claim 5 wherein the gas outlets of said first chamber extend around a lower end of the inner side wall thereof, and wherein the gas outlet in said central chamber is in a top wall thereof.

7. A gas scrubber as described in claim 6 wherein the gas inlet of said first chamber has a width substantially equal to the distance between the side walls thereof.

8. A gas scrubber as described in claim 4, additionally comprising a toroidal second chamber disposed radially inward of said first chamber and adjacent thereto, said second chamber having gas inlets extending substantially around an end of the outer wall and aligned and communicating with the gas outlets of said first chamber, and having gas outlets extending substantially around the other end of the inner wall.

9. A gas scrubber as described in claim 4, additionally comprising a plurality of adjacent, concentric toroidal chambers disposed in a radially inwardly extending sequence, the outermost of said chambers being disposed radially inward of said first chamber and adjacent thereto, each of said toroidal chambers having gas inlets extending substantially around an end of the outer side wall, and having gas outlets extending substantially around the other end of the inner wall, the gas inlets of the outermost toroidal chamber being aligned and communicating with the gas outlets of said first chamber, and the gas outlets of each toroidal chamber being aligned and communicating with the gas inlets of the adjacent inner toroidal chamber.

10. A gas scrubber as described in claim 9 wherein each of said toroidal chambers has a substantially rectangular vertical cross section.

11. A gas scrubber as described in claim 9 additionally comprising a substantially clyindrical central chamber disposed adjacent the innermost of said toroidal chambers, said central chamber having gas inlets extending substantially around an end of the side wall thereof and aligned and communicating with the gas outlets of the innermost of said toroidal chambers, and having a gas outlet.

12. A gas scrubber as described in claim 11 wherein the gas outlets of said first chamber extend around a lower end of the inner side wall thereof, and wherein the number of toroidal chambers is two and the gas outlet in said central chamber is in a top wall thereof.

13. A gas scrubber as described in claim 8, 9, or 12 wherein the gas inlet of said first chamber has a width substantially equal to thedistance between the side walls thereof.

14. A gas scrubber as described in claim 8, 9, or 12 additionally comprising liquid spray nozzles positioned in each of said toroidal chambers and said central chamber to spray downward in respective chambers.

15. A gas scrubber as described in claim 10, 11, or 12 wherein all of said chambers are disposed in a substantially cylindrical housing, the bottom wall of which acts as the bottom wall of each of said chambers, the top wall of which acts as the top wall of each of said toroidal chambers and the side wall of which acts as the outer side wall of said first chamber, the housing having a plurality of concentric substantially cylindrical baffles, each defining an inner side wall of one of said chambers and an outer side wall of the inner chamber adjacent thereto.

16. A gas scrubber as described in claim 12 additionally comprising a packing in the outermost of said toroidal chambers and in said central chamber.

17. A gas scrubber as described in claim 16 wherein the gas inlet of said first chamber is substantially equal in width thereto.

18. A gas scrubber as described in claim 16 or 17 additionally comprising liquid spray nozzles positioned in each of said toroidal chambers and said central chamber to spray downward in respective chambers.

* * * * *